United States Patent
Takahashi et al.

(10) Patent No.: US 12,196,641 B2
(45) Date of Patent: Jan. 14, 2025

(54) VEHICLE INSPECTION DEVICE WITH ROLLERS AND ELEVATING STOPPER MECHANISM ABUTTING TIRE

(71) Applicant: MEIDENSHA CORPORATION, Tokyo (JP)

(72) Inventors: Toshimichi Takahashi, Ota (JP); Keisuke Tada, Ota (JP); Morio Onai, Maebashi (JP)

(73) Assignee: MEIDENSHA CORPORATION, Tokyo (JP)

( * ) Notice: Subject to any disclaimer, the term of this patent is extended or adjusted under 35 U.S.C. 154(b) by 0 days.

(21) Appl. No.: 18/273,927

(22) PCT Filed: Jan. 11, 2022

(86) PCT No.: PCT/JP2022/000511
§ 371 (c)(1),
(2) Date: Jul. 24, 2023

(87) PCT Pub. No.: WO2022/158330
PCT Pub. Date: Jul. 28, 2022

(65) Prior Publication Data
US 2024/0077387 A1    Mar. 7, 2024

(30) Foreign Application Priority Data

Jan. 25, 2021 (JP) .................................. 2021-009302
Jan. 25, 2021 (JP) .................................. 2021-009303

(51) Int. Cl.
*G01M 17/02* (2006.01)

(52) U.S. Cl.
CPC ................................ *G01M 17/022* (2013.01)

(58) Field of Classification Search
CPC .................................................. G01M 17/022
See application file for complete search history.

(56) References Cited

U.S. PATENT DOCUMENTS 6,813,939 B1 *  11/2004  Wilcoxon ............... G01L 5/282
                                                                73/146
2008/0060271 A1   3/2008  Beniamin et al.

FOREIGN PATENT DOCUMENTS

| CN | 209069593 U | * | 7/2019 | .......... G01M 17/007 |
|---|---|---|---|---|
| CN | 211855848 U |  | 11/2020 |  |
| DE | 3844887 C2 | * | 2/1997 | ............ G01B 5/255 |
| JP | H06-063927 B2 |  | 8/1994 |  |
| JP | H07-243946 A |  | 9/1995 |  |

(Continued)

OTHER PUBLICATIONS

Office Action issued in corresponding Chinese Patent Application No. 202280008800.0, dated Jan. 1, 2024. (13 pages).

*Primary Examiner* — Eric S. McCall
*Assistant Examiner* — Timothy P Graves
(74) *Attorney, Agent, or Firm* — Foley & Lardner LLP

(57) ABSTRACT

A vehicle inspection device for an inspection implemented with a tire of a vehicle idling includes a tire supporter. The tire supporter includes rollers structured to allow the tire to idle; a housing supporting the rollers so as to allow the rollers to rotate; a stopper contained in the housing and structured to move up and down and butt into the tire disposed on the rollers; and a link mechanism structured to elevate the stopper. The vehicle inspection device is structured to be disposed on a plane that allows the vehicle to run thereon.

13 Claims, 10 Drawing Sheets

(56) References Cited

FOREIGN PATENT DOCUMENTS

| | | | |
|---|---|---|---|
| JP | 2002-340743 | A | 11/2002 |
| JP | 2003-114171 | A | 4/2003 |
| JP | 2008-292160 | A | 12/2008 |
| JP | 2009-216606 | A | 9/2009 |
| JP | 2010169485 | A * | 8/2010 |
| JP | 2010-202052 | A | 9/2010 |
| JP | 2010-210325 | A | 9/2010 |
| JP | 2013195316 | A * | 9/2013 |

* cited by examiner

VEHICLE INSPECTION DEVICE WITH ROLLERS AND ELEVATING STOPPER MECHANISM ABUTTING TIRE

TECHNICAL FIELD

The present invention relates to an inspection device structured to support a tire so as to allow the tire to idlingly rotate, for an assessment inspection of vehicle conditions.

BACKGROUND ART

Patent Document 1 discloses an auxiliary device for testing a vehicle. The auxiliary device includes: rollers structured to support a wheel (i.e., a tire) so as to allow the wheel to rotate; a base frame supporting the rollers so as to allow the rollers to rotate; frames facing the base frame; and embarkation boards mounted to the frames. The testing auxiliary device of Patent Document 1 is structured to be moved with use of a caster.

Patent Document 2 discloses a vehicle inspection device structured to make a wheel on free rollers escape from the free rollers by projecting plate pieces through gaps between the free rollers and thereby causing the wheel to travel along top ends of the plate pieces.

However, the testing auxiliary device of Patent Document 1 includes neither a fixing mechanism (i.e., a brake mechanism) for stopping rotation of the rollers nor a mechanism for stopping idling of the wheel (the tire), and may have difficulty in exchanging vehicles after completion of a test, due to idling of the wheel. Accordingly, the testing auxiliary device of Patent Document 1 is likely to need an incidental device such as a winch for exerting a force on a vehicle (e.g., pulling the vehicle) from the outside for unloading the wheel from the rollers.

The vehicle inspection device of Patent Document 2 needs a space (i.e., a pit) formed, for example, on a floor under the free rollers, for disposing an elevation device structured to project the plate pieces. This is likely to reduce flexibility in selecting a place for implementing inspection.

Thus, an inspection device structured to support a tire so as to allow the tire to idle for an assessment inspection of vehicle conditions has room for further improvement in view of presence/absence of necessity for an incidental device to unload a wheel from rollers and in view of flexibility in selecting a place for implementing inspection.

PRIOR ART DOCUMENT(S)

Patent Document(s)

Patent Document 1: JP 2003-114171 A
Patent Document 2: JP H06-63927 B2

SUMMARY OF THE INVENTION

According to one aspect of the present invention, a vehicle inspection device for an inspection implemented with a tire of a vehicle idling includes a tire supporter. The tire supporter includes: rollers structured to allow the tire to idle; a housing supporting the rollers so as to allow the rollers to rotate; a stopper contained in the housing and structured to move up and down and butt into the tire disposed on the rollers; and a link mechanism structured to elevate the stopper. The vehicle inspection device is structured to be disposed on a plane that allows the vehicle to run thereon.

According to a favorable aspect, the stopper is disposed between the rollers, and moves up and down between the rollers.

According to another favorable aspect, the vehicle inspection device further includes a limit switch structured to detect an elevation state of the stopper.

According to still another favorable aspect, the vehicle inspection device further includes three movement rollers mounted to an exterior of the housing such that each of the three movement rollers is rotatable.

According to still another favorable aspect, the vehicle inspection device includes a pair of the tire supporters aligned in a vehicle width direction and coupled to each other.

According to still another favorable aspect, the vehicle inspection device further includes a side roller structured to restrict movement of the vehicle in the vehicle width direction and rotatably supported by the housing.

According to still another favorable aspect, the vehicle inspection device is structured to allow change in mounting position of the side roller depending on a tread width of the vehicle.

According to still another favorable aspect, the vehicle inspection device further includes a slope being detachably mounted to the housing and including an inclined surface structured to guide the tire to the rollers.

According to still another favorable aspect, the vehicle inspection device includes a plurality of the tire supporters aligned in a vehicle front-and-rear direction, wherein each pair of the tire supporters different from each other in position in the vehicle front-and-rear direction are different from each other in length in the vehicle front-and-rear direction of the slopes mounted to the each pair of the tire supporters.

According to still another favorable aspect, the side roller is rotatably supported by a supporter mounted to the housing, wherein the supporter includes a support piece inserted in a groove formed in the housing. The slope includes an insertion piece inserted in the groove, and is detachably mounted to the housing by the insertion of the insertion piece.

According to still another favorable aspect, the vehicle inspection device further includes a safety fence that is detachably mounted to the housing at a position outer with respect to the side roller.

According to still another favorable aspect, the vehicle inspection device further includes a safety fence detachably mounted to the housing and positioned outer with respect to the tire of the vehicle in the vehicle width direction.

According to the present invention, a vehicle inspection device can be installed on a plane that allows a vehicle to run thereon. This eliminates necessity for forming a pit (i.e. a depression) on a floor upon the installation, and thereby increases flexibility in selecting a place for implementing inspection.

According to the present invention, a vehicle inspection device includes a stopper structured to butt into a tire. This allows an inspection target vehicle to ride onto and get off from the inspection device by self-propellant without an incidental device such as a winch.

MODE(S) FOR CARRYING OUT THE INVENTION

The following details an embodiment of the present invention with reference to the drawings.

FIGS. 1 to 11 are illustrative views of an inspection device 1 according to the present invention. Inspection device 1 includes tire supporters 2.

Figure 1:
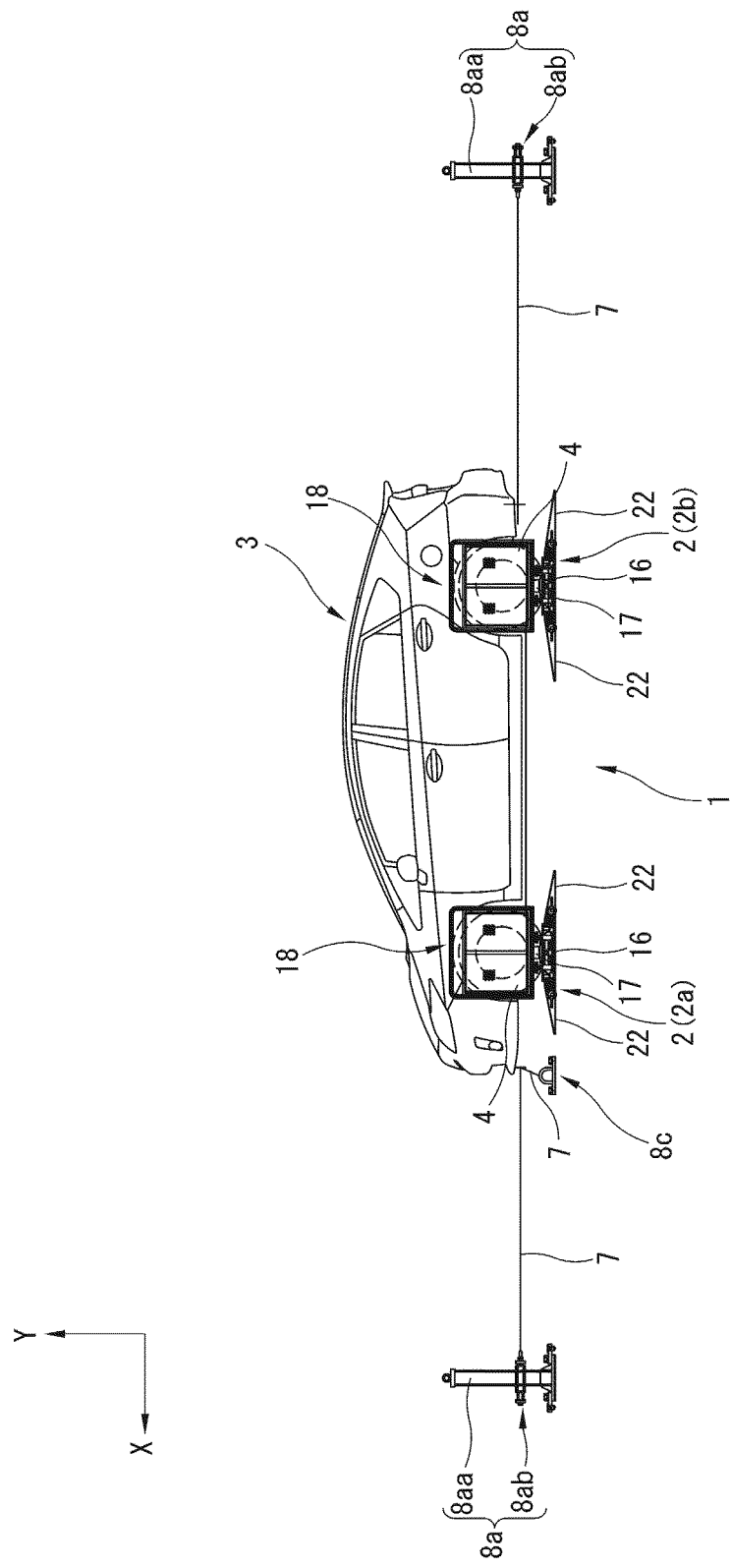
FIG. 1 is an illustrative view schematically showing a vehicle inspection device according to the present invention.
Figure 2:
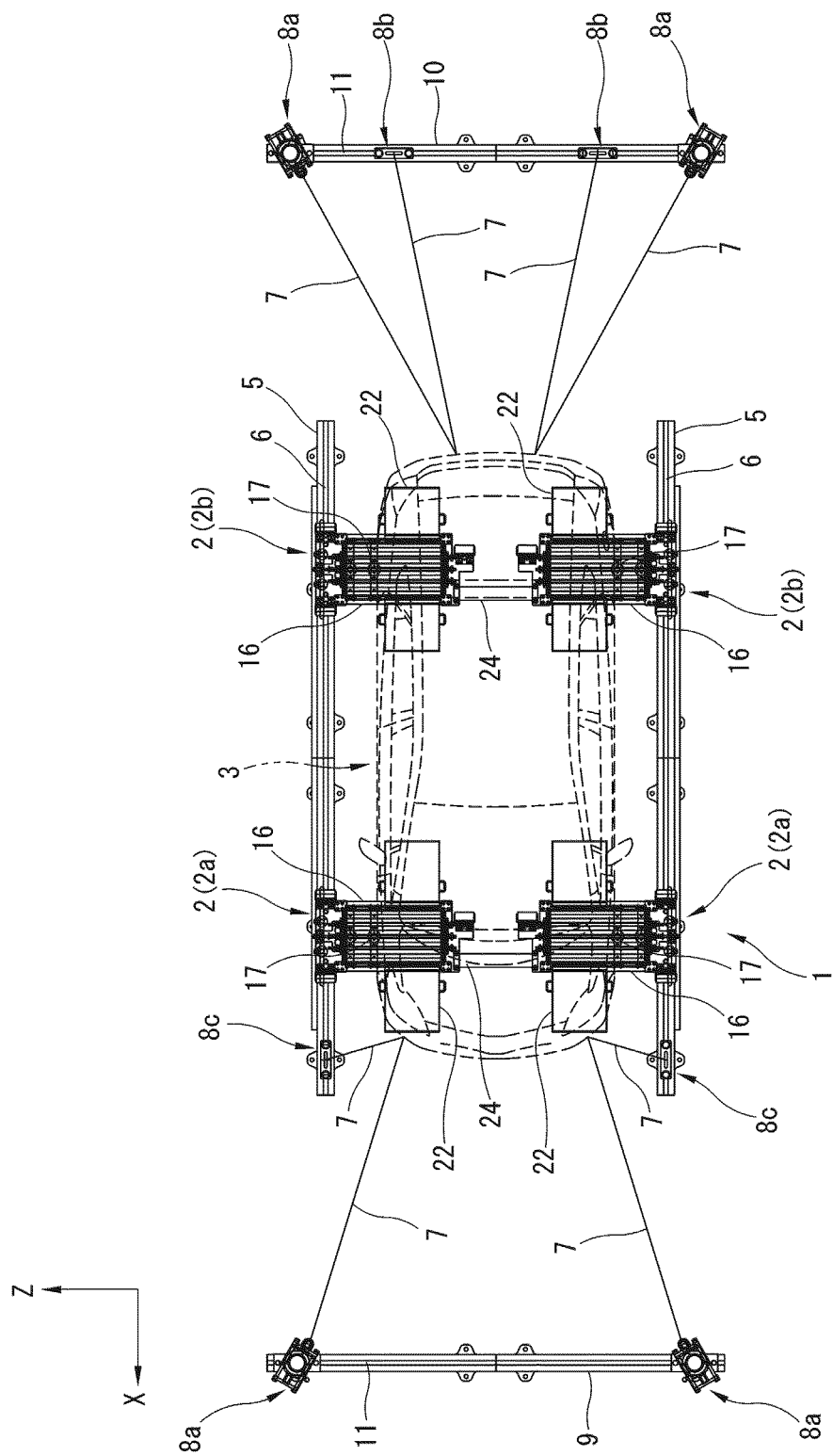
FIG. 2 is an illustrative view schematically showing the vehicle inspection device according to the present invention.

FIGS. 1 and 2 are schematic illustrative views of inspection device 1 according to the present invention, and show a case that every one of tires (i.e., wheels) 4 of a vehicle 3 is provided with a corresponding one of tire supporters 2. Tire supporters 2 may be disposed for only some of the tires of vehicle 3.

Figure 3:
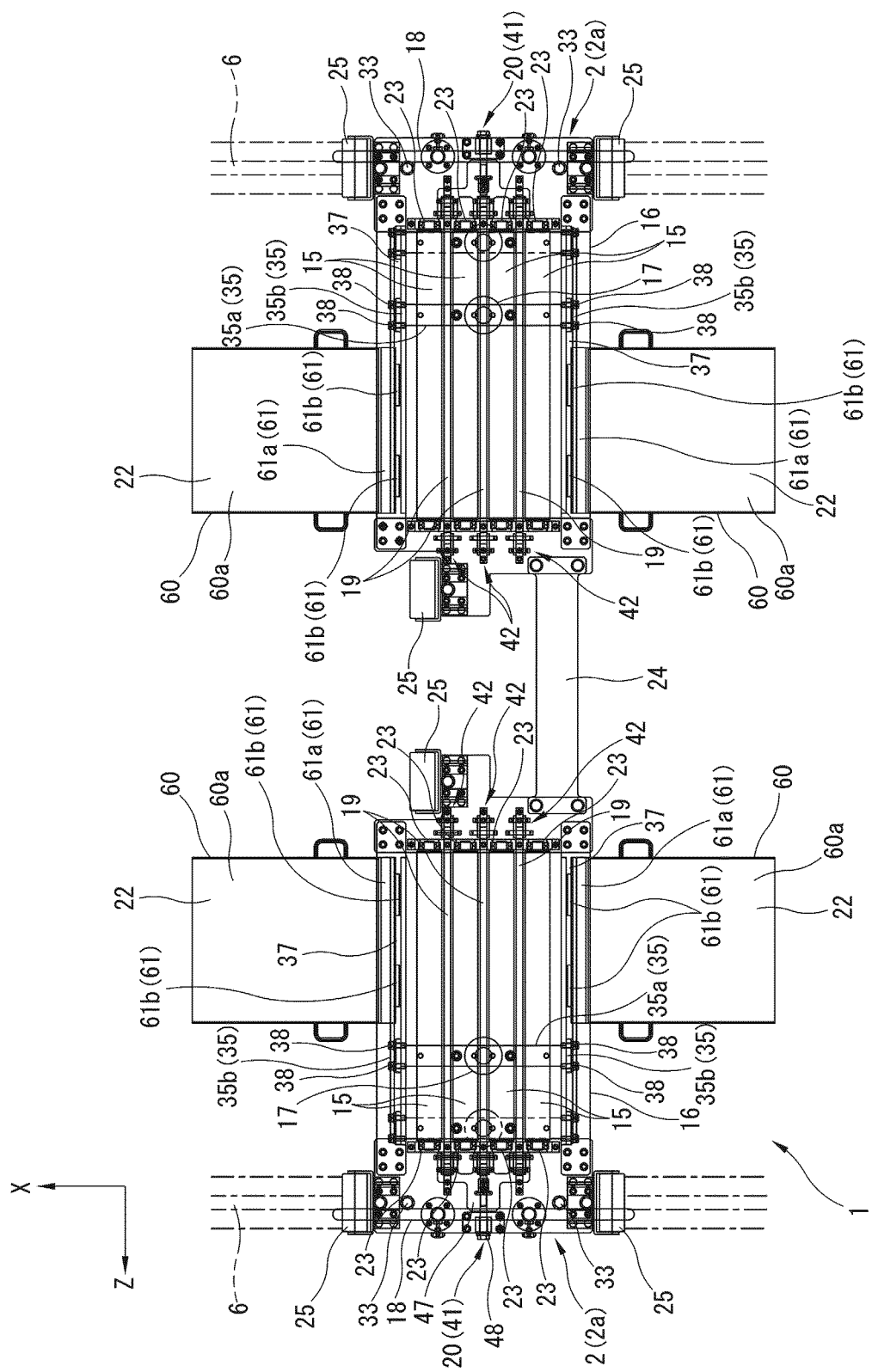
FIG. 3 is a plan view of tire supporters.
Figure 4:
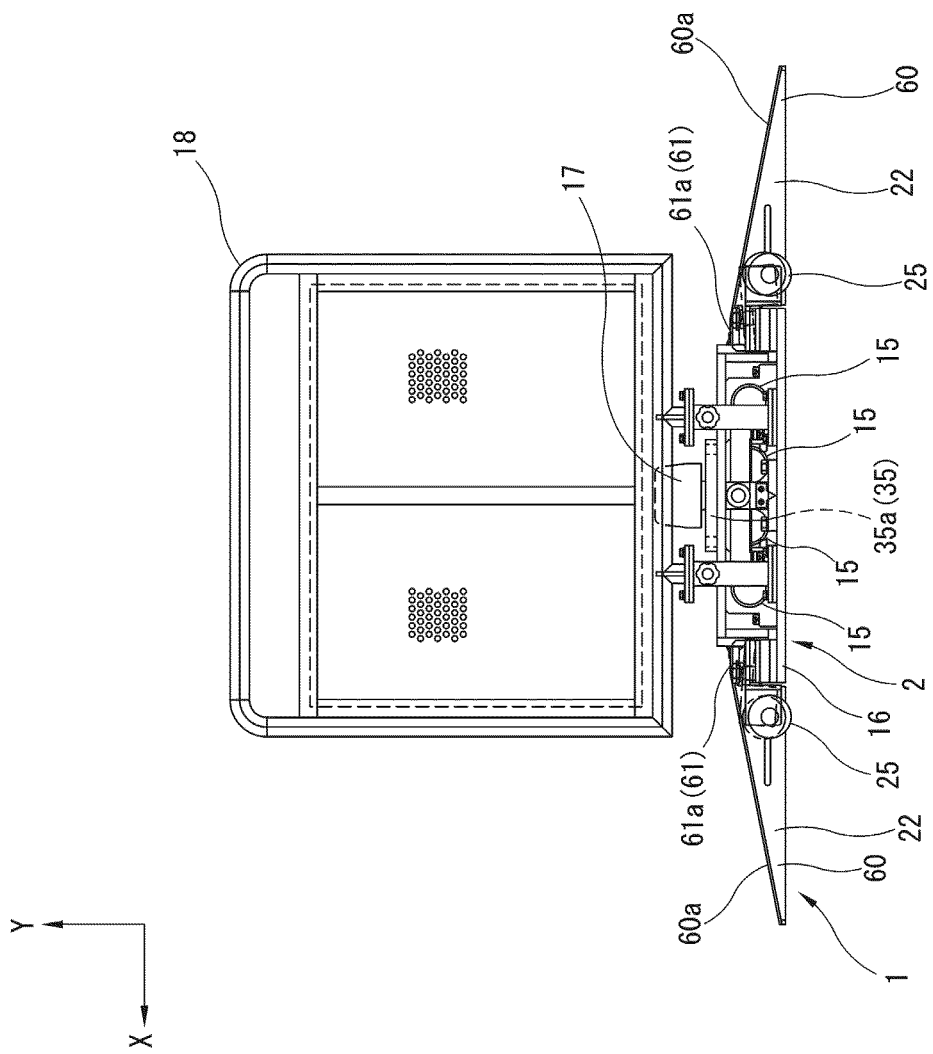
FIG. 4 is a side view of one of the tire supporters.
Figure 5:
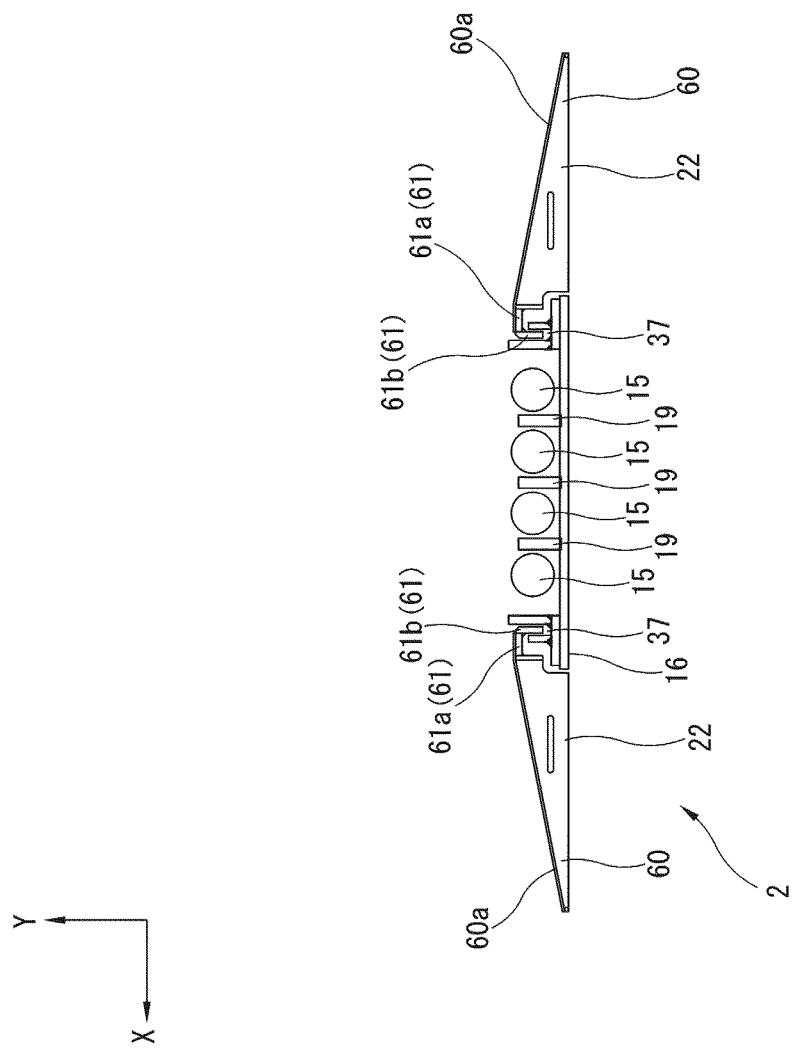
FIG. 5 is an illustrative view schematically showing a focused part of one of the tire supporters.
Figure 6:
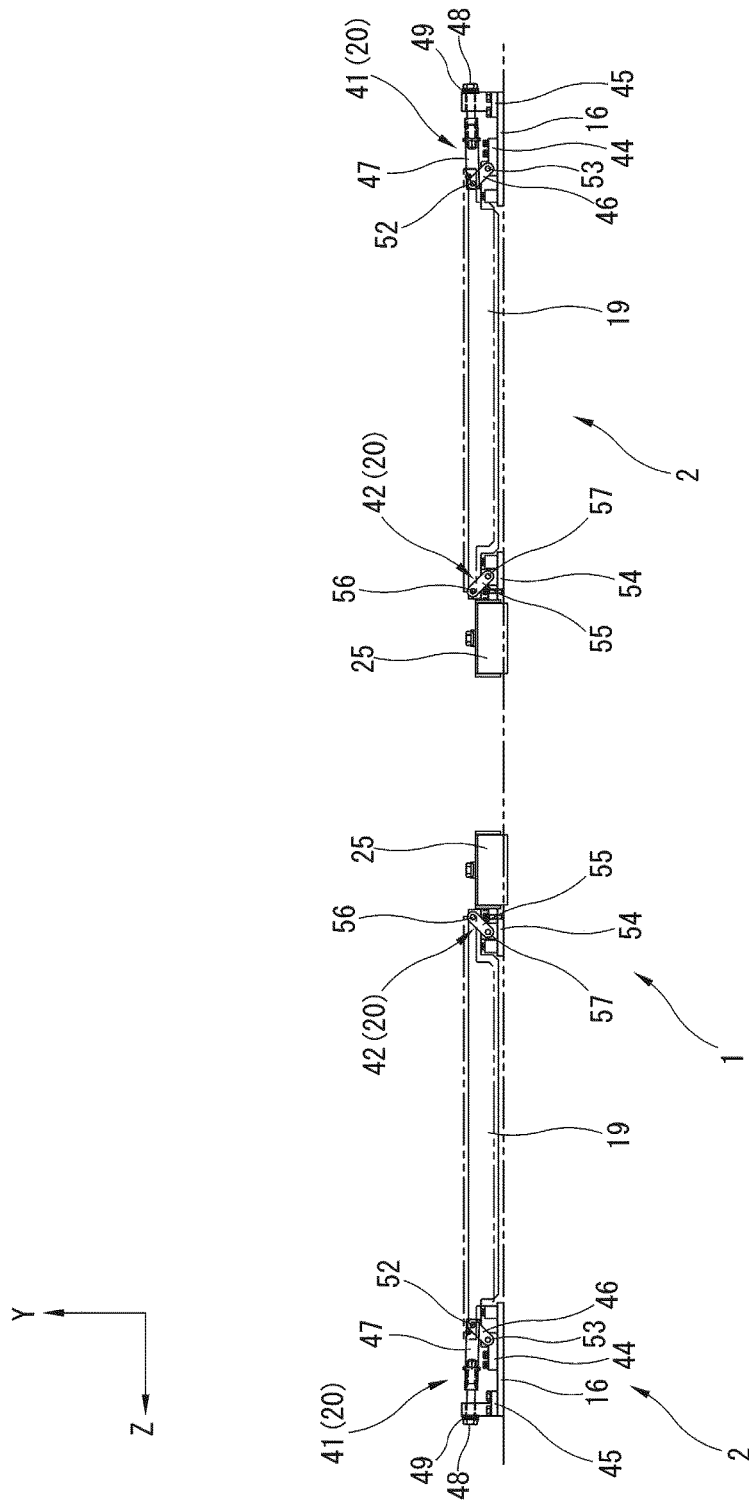
FIG. 6 is an illustrative view schematically showing focused parts of link mechanisms of the tire supporters.
Figure 7:
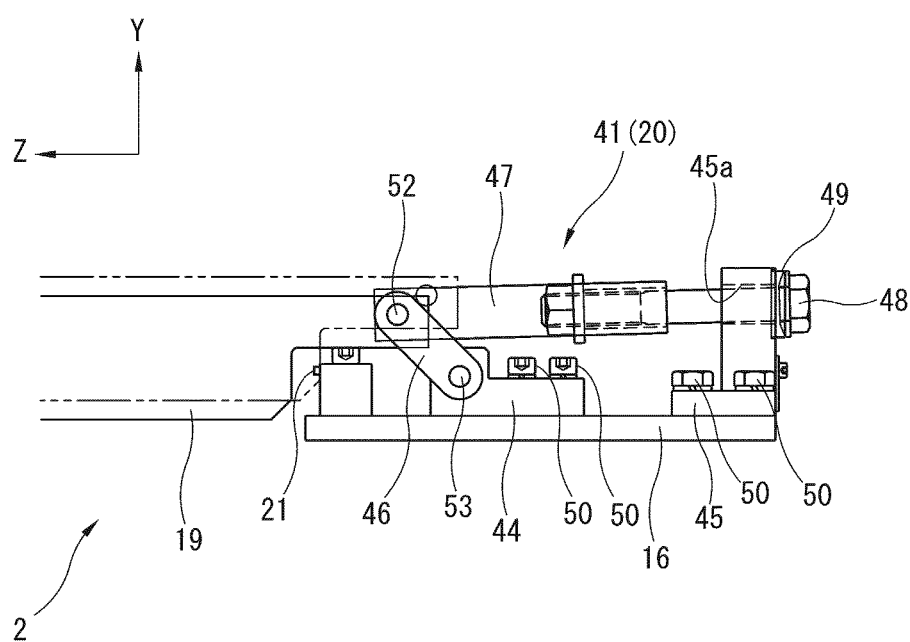
FIG. 7 is an illustrative view schematically showing a focused part of one of the tire supporters.
Figure 8:
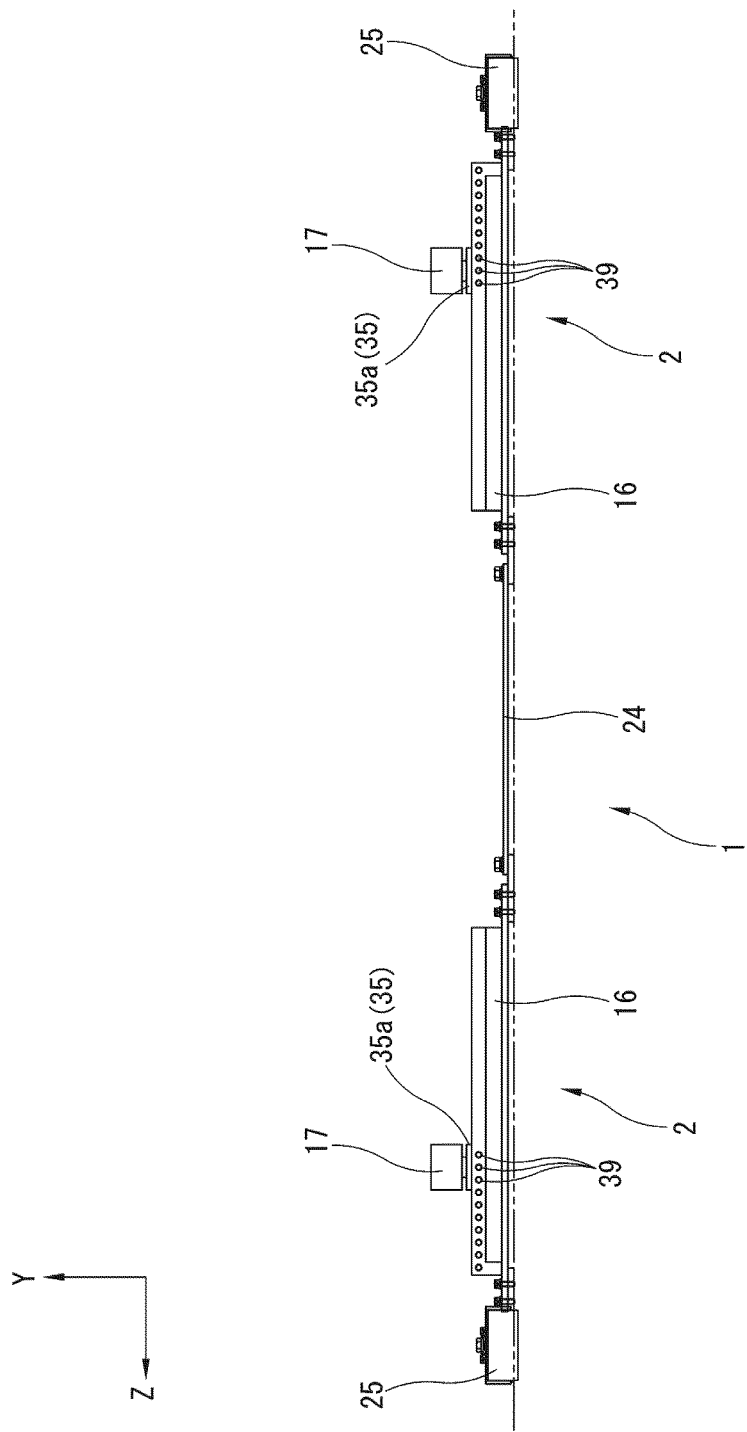
FIG. 8 is a front view of the tire supporters.
Figure 9:
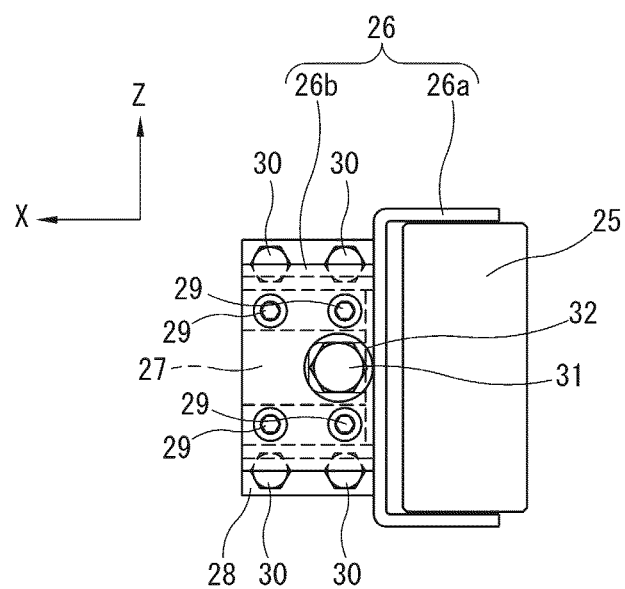
FIG. 9 is a plan view of one of movement rollers of the tire supporters.
Figure 10:
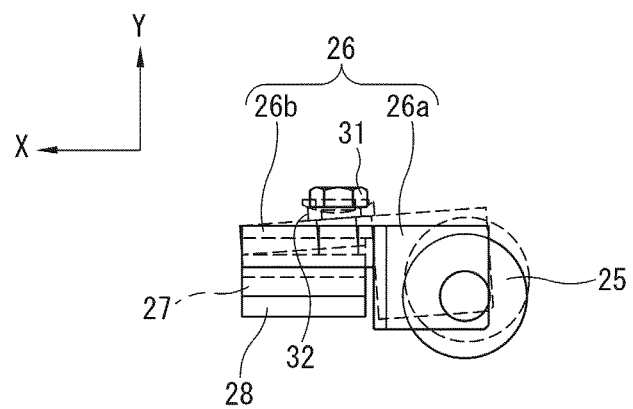
FIG. 10 is a side view of one of movement rollers of the tire supporters.
Figure 11:
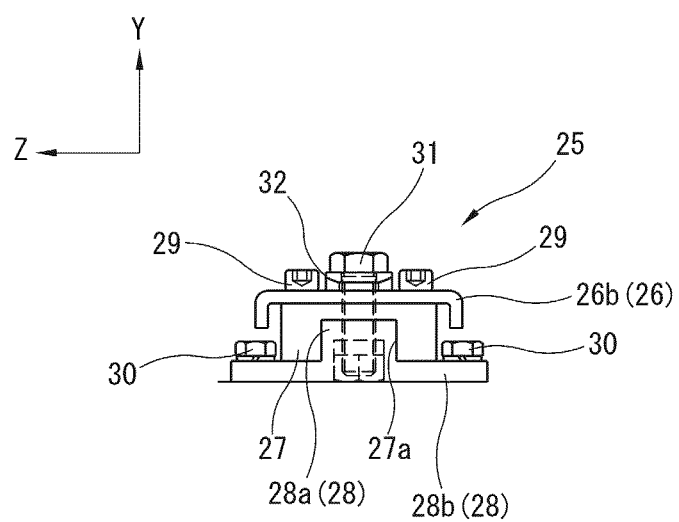
FIG. 11 is a rear view of one of movement rollers of the tire supporters.

FIG. 1 is a side view of tire supporters 2 composing inspection device 1, and shows from a left side of vehicle 3 a situation in which tire supporters 2 are mounted to front and rear wheels on right and left sides of vehicle 3. FIG. 2 is a plan view showing the situation in which tire supporters 2 are mounted to the front and rear wheels on the right and left sides of vehicle 3. FIG. 3 is a plan view of a right-and-left pair of tire supporters 2 (2a) for the front wheels of vehicle 3, wherein tires 4 of the right and left front wheels ride onto tire supporters 2a. FIG. 4 is a side view of one of tire supporters 2. FIG. 5 is an illustrative view schematically showing a focused part of one of tire supporters 2. FIG. 6 is an illustrative view schematically showing focused parts of link mechanisms 20 of a right-and-left pair of tire supporters 2. FIG. 7 is an illustrative view schematically showing a focused part of one of tire supporters 2. FIG. 8 is a front view of a right-and-left pair of tire supporters 2. FIG. 9 is a plan view of one of movement rollers 25 of tire supporters 2. FIG. 10 is a side view of one of movement rollers 25 of tire supporters 2. FIG. 11 is a rear view of one of movement rollers 25 of tire supporters 2.

FIGS. 1 to 11 show an X-axis, a Y-axis, and a Z-axis that are orthogonal to each other. In the present description, X-axis is an axis in a longitudinal direction of vehicle 3. Y-axis is an axis in a height direction of vehicle 3. Z-axis is an axis in a width direction of vehicle 3.

Furthermore, in the present description, "vehicle up-and-down direction" refers to an up-and-down direction with respect to an inspection target vehicle during inspection, and is identical to the direction of Y-axis. "Vehicle front-and-rear direction" refers to a front-and-rear direction with respect to an inspection target vehicle during inspection, and is identical to the direction of X-axis. "Vehicle width direction" refers to a width direction with respect to an inspection target vehicle during inspection, and is identical to the direction of Z-axis.

As shown in FIGS. 1 and 2, inspection device 1 is used for an inspection implemented in a state in which tires 4 of vehicle 3 are idlingly rotating. Inspection device 1 includes tire supporters 2 that are fixed at positions in conformance with intervals between the front and rear wheels of vehicle 3 being a target of the inspection. Tire supporters 2a are a right-and-left pair of tire supporters 2 corresponding to the front wheels of vehicle 3. Tire supporters 2b are a right-and-left pair of tire supporters 2 corresponding to the rear wheels of vehicle 3.

Tire supporters 2a and tire supporters 2b are configured similarly to each other except lengths of slopes 22 (described below) in the vehicle front-and-rear direction.

Tire supporters 2 are movable along side rails 5, and are fixed at the positions in conformance with the intervals between the front and rear wheels of vehicle 3 being the inspection target.

Side rails 5 are rectangular plate members elongated to extend straight, and are disposed adjacently to both sides of vehicle 3 being the inspection target. Each of side rails 5 is made of a metallic material such as an iron, and includes a first track (i.e., a travel track) 6 extending straight to allow movement rollers 25 described below of tire supporters 2 to travel along the track (i.e., rotate and move on the track).

The pair of side rails 5 disposed adjacently to the both sides of vehicle 3 of the inspection target are arranged at an interval in the vehicle width direction that is set in conformance with, for example, a tread width of vehicle 3 of the inspection target. Side rails 5 are fixed to a floor of a place for implementing the inspection such as an indoor test site, and facilitate straight movement of tire supporters 2 along side rails 5.

Vehicle 3 during the inspection is retained in a state of being pulled in the vehicle front-and-rear direction etc. with tensile members 7 such as chains or wires. The reference numerals 8a, 8b, and 8c in FIGS. 1 and 2 represent vehicle retainers to which first ends of tensile members 7 are attached.

Each of vehicle retainers 8a is fixed to a corresponding one of front rail 9 and rear rail 10 that are straight rails arranged to interpose vehicle 3 of the inspection target in the vehicle front-and-rear direction. Vehicle retainers 8b are fixed to rear rail 10. Each of vehicle retainers 8c is fixed to a corresponding one of side rails 5 so as to be positioned on first track 6.

Each of vehicle retainers 8a is substantially composed of a base part 8aa slidably mounted to a corresponding one of front rail 9 and rear rail 10 and a retention part 8ab vertically movably mounted to base part 8aa. Base part 8aa is fixed to the corresponding one of front rail 9 and rear rail 10. Retention part 8ab is fixed to base part 8aa. Each of vehicle retainers 8b is slidably mounted to rear rail 10.

Front rail 9 and rear rail 10 are made of a metallic material such as an iron.

Front rail 9 facilitates straight movement of vehicle retainers 8a along front rail 9. Rear rail 10 facilitates straight movement of vehicle retainers 8a and 8b along rear rail 10.

Each of front rail 9 and rear rail 10 includes a second track 11 extending straight to allow vehicle retainers 8a and 8b to travel thereon. Each of vehicle retainers 8a is fixed to the corresponding one of front rail 9 and rear rail 10 so as to be positioned on second track 11. Each of vehicle retainers 8b is fixed to rear rail 10 so as to be positioned on second track 11.

Front rail 9 and rear rail 10 are arranged at an interval in the vehicle front-and-rear direction that is set in conformance with, for example, an entire length of vehicle 3 of the inspection target.

Front rail 9 and rear rail 10 are fixed to a floor of a place for implementing the inspection such as an indoor test site.

As shown in FIGS. 1 to 6, each of tire supporters 2 includes rollers 15 (e.g., four rollers 15 in the present embodiment), a housing 16, a side roller 17, a safety fence 18, stoppers 19, a link mechanism 20, a limit switch 21, and slopes 22. Rollers 15 allow tire 4 to idle. Housing 16 supports rollers 15 so as to allow rollers 15 to rotate. Side roller 17 is positioned to face a corresponding one of both sides of vehicle 3. Safety fence 18 is mounted to housing 16. Stoppers 19 are contained in housing 16, and are structured to move up and down. Link mechanism 20 is structured to elevate stoppers 19. Limit switch 21 detects an elevation state of stoppers 19. Slopes 22 are detachably mounted to housing 16.

Rollers 15 are shaped cylindrical or columnar, and support tire 4 rotatably. Each of rollers 15 is made of a metallic material such as a stainless or an iron, and includes a pair of ends each of which is rotatably supported by housing 16 via a bearing 23. As shown in FIGS. 2 and 3, rollers 15 inside housing 16 have rotational axes parallel with each other, and are structured to rotate in a same direction. Rollers 15 inside housing 16 are arranged apart from each other at predetermined intervals. Each of rollers 15 has a length in its axial direction that is longer than a width of tire 4.

Housing 16 is made of a metallic material such as an iron, and has a shape of a rectangular box. Housing 16 serves as a body of inspection device 1, and is disposed or installed on a floor (i.e., a plane on which vehicle 3 can run).

As shown in FIGS. 2 and 3, each pair of tire supporters 2 aligned in the vehicle width direction are coupled to each other via a coupler 24 having a shape of an elongated rectangular plate. In other words, each pair of housings 16 aligned in the vehicle width direction are coupled to each other via coupler 24. Coupler 24 to couple each right-and-left pair of tire supporters 2 may be used only for adjustment to accord central positions of the right-and-left pair of housings 16, and be detached after completion of the adjustment.

Each of housings 16 is provided with three rollers 15 shaped cylindrical or columnar and mounted to an exterior of housing 16. The three movement rollers 25 are made of a resin material such as an urethane, and have rotational axes parallel with each other, and are mounted to housing 16 so as to rotate in a same direction.

Each of housings 16 includes a first end side to which two movement rollers 25 are mounted and a second end side to which one movement roller 25 is mounted. The two movement rollers 25 of the first end side are mounted to housing 16 so as to be aligned in a direction perpendicular to the rotational axes of the two movement rollers 25 in a plan view (e.g., the vehicle front-and-rear direction).

In detail, as shown in FIGS. 9 to 11, each of movement rollers 25 is mounted to housing 16 via a first supporter 26, a second supporter 27, and a third supporter 28. First supporter 26, second supporter 27, and third supporter 28 are made of a metallic material such as an iron.

First supporter 26 includes a roller support part 26a supporting movement roller 25 rotatably and a mount part 26b overlapping with second supporter 27.

As shown in FIG. 9 in a plan view, roller support part 26a has a substantially U-shape, and interposes movement roller 25 therein in a direction of the rotational axis of the movement roller 25.

Mount part 26b is a rectangular plate member, and is mounted to second supporter 27 with four screws 29 such as bolts.

As shown in FIG. 11, second supporter 27 has a substantially U-shaped cross section, and includes a recessed groove 27a in a center thereof. Second supporter 27 is disposed under mount part 26b of first supporter 26.

As shown in FIG. 11, third supporter 28 has a substantially T-shaped cross section, and is disposed under second supporter 27. Third supporter 28 includes a projection part 28a in a center thereof and flat parts 28b adjacent to both sides of projection part 28a. Projection part 28a is inserted in recessed groove 27a of second supporter 27, and is substantially equal to recessed groove 27a in width. Flat parts 28b are fixed to housing 16 with screws 30 such as bolts.

Mount part 26b of first supporter 26, second supporter 27, and projection part 28a of third supporter 28 are pierced by a fixing screw 31 such as a bolt. Mount part 26b and a head of fixing screw 31 interpose therebetween a fixing spherical washer (i.e., a first spherical washer) 32.

Roller support part 26a being a tip of first supporter 26 is pressed downward (i.e., toward the floor) by operating an operation handle (not shown) mounted to fixing spherical washer 32 and rotating fixing screw 31 that is in screw connection with (i.e., screwed in) fixing spherical washer 32. This action of rotating (i.e., fastening) fixing screw 31 causes movement roller 25 to be pressed downward onto the floor, and thereby causes housing 16 to be lifted and become movable.

Housing 16 being the body of inspection device 1 is brought into contact with the floor by rotating (i.e., unfastening) fixing screw 31, and is fixed to the floor etc. in a place for the inspection by fixing bolts 33 extending through housing 16, to side rails 5. Side rails 5 are provided with nuts not shown for fixing of housing 16 (i.e., fixing of inspection device 1).

As shown in FIGS. 1 to 4, side roller 17 is rotatably mounted to and supported by housing 16. Side roller 17 has a cylindrical or columnar shape, and restricts movement of vehicle 3 in the vehicle width direction during the inspection. Side roller 17 is made of a metallic material such as a stainless or an iron. Side roller 17 may be mounted to various positions depending on the tread width of vehicle 3.

In detail, as shown in FIGS. 3, 4, and 8, side roller 17 is rotatably supported by a supporter 35 shaped to be an elongated rectangular plate and mounted to housing 16. Supporter 35 is made of a metallic material such as an iron, and includes a pair of ends bent in a same direction, and has a substantially U-shape as a whole. In other words, supporter 35 includes a body 35a in a center thereof and a pair of support pieces 35b disposed in both sides of supporter 35 and bent with respect to body 35a. Body 35a supports side roller 17 rotatably in its center in a longitudinal direction thereof. As shown in FIG. 3, each of support pieces 35b is inserted in a groove 37 formed in housing 16, and is fixed to groove 37 with mount screws 38 such as bolts.

Each of grooves 37 has a substantially U-shaped cross section, and, as shown in FIGS. 3 and 5, continuously extends straight along a corresponding one of edges of housing 16 in the vehicle front side and the vehicle rear side.

As shown in FIG. 8, each of grooves 37 includes a pair of side walls each of which includes housing screw holes 39 through which mount screws 38 extends.

Supporter 35 is fixed to housing 16 at a position depending on the tread width of vehicle 3, by changing choice of housing screw holes 39 to be used for fixing of support pieces 35b.

As shown in FIGS. 1, 3, and 4, safety fence 18 is detachably mounted to an end of housing 16 in the vehicle width direction, and is positioned outer with respect to side roller 17 in the vehicle width direction. Safety fence 18 has a substantially rectangular outline, and has a size sufficient to cover, in a side view of vehicle 3, tire 4 disposed on inspection device 1 to which safety fence 18 is mounted.

As shown in FIGS. 3, 5, 6, and 7, each of stoppers 19 is composed of a thin plate member having an elongated rectangular shape, and is made of a metallic material such as an iron. Each of stoppers 19 is disposed between two of rollers 15 adjacent to each other. In other words, both sides of each stopper 19 face rollers 15. Between adjacent two of rollers 15, one stopper 19 is disposed. According to the present embodiment, three stoppers 19 are disposed between four rollers 15. Each of stoppers 19 is disposed between adjacent two of rollers 15, so as to extend parallel with the adjacent two of rollers 15. Each of stoppers 19 is structured to move up and down between adjacent two of rollers 15, and project through a gap between rollers 15 to butt into tire 4 disposed on rollers 15 after completion of the inspection. Thus, each of stoppers 19 during the inspection is buried between rollers 15 so as not to contact with tire 4.

Link mechanism 20 includes a first link mechanism 41 and a second link mechanism 42. First link mechanism 41 supports first ends of stoppers 19 rotatably. Second link mechanism 42 supports second ends of stoppers 19 rotatably.

As shown in FIGS. 3, 6, and 7, first link mechanism 41 includes a first fixture 44, a second fixture 45, first links 46, a second link 47, an elevation screw 48, and an elevation spherical washer (i.e., a second spherical washer) 49, and is disposed in an end of inspection device 1 in a vehicle outer side in the vehicle width direction. The above components of first link mechanism 41 are made of a metallic material such as an iron.

First fixture 44 and second fixture 45 are fixed to housing 16 with screws 50 such as bolts. As shown in FIG. 7, first fixture 44 is positioned nearer to vehicle 3 than second fixture 45 and apart from second fixture 45 in the vehicle width direction. First fixture 44 and second fixture 45 may be integrated into one component.

As shown in FIGS. 6 and 7, each of first links 46 includes a first end rotatably connected to a corresponding one of the first ends of stoppers 19 via a first connection pin 52, and includes a second end rotatably connected to first fixture 44 via a second connection pin 53.

Second link 47 includes first ends rotatably connected to the first ends of stoppers 19 via first connection pins 52, and includes a second end being in screw connection with a tip of elevation screw 48 (i.e., connected to the tip of elevation screw 48 by screwing). Second link 47 in plan view has a shape of a three-pronged fork that includes tips respectively connected to different ones of stoppers 19.

Elevation screw 48 extends through a through hole 45a formed in second fixture 45. Through hole 45a has an inner diameter greater than a diameter of a shaft part of elevation screw 48.

Elevation spherical washer 49 receives elevation screw 48 extending through it, and is sandwiched between second fixture 45 and a head of elevation screw 48. Elevation spherical washer 49 is in screw connection with elevation screw 48.

Elevation screw 48 is structured to move forward and backward (i.e., reciprocate) in the vehicle width direction with respect to second fixture 45, by rotating elevation screw 48. This causes second link 47 connected with the tip of elevation screw 48 to move forward and backward (i.e., reciprocate) in the vehicle width direction.

As shown in FIG. 6, second link mechanism 42 includes a third fixture 54 and third links 55. Third links 55 are connected to third fixture 54 and stoppers 19.

Second link mechanism 42 is disposed in an end of inspection device 1 facing the vehicle in the vehicle width direction. The above components of second link mechanism 42 are made of a metallic material such as an iron.

Each of third links 55 includes a first end rotatably connected to a corresponding one of the second ends of stoppers 19 via a third connection pin 56, and includes a second end rotatably connected to third fixture 54 via a fourth connection pin 57.

In response to the forward and backward movement (i.e., reciprocation) of second link 47, stoppers 19 move upward and downward in the height direction of vehicle 3 while being supported by first links 46.

As shown in FIG. 7, limit switch 21 is mounted to housing 16 so as to contact with a corresponding one of stoppers 19 when stoppers 19 come to upward limit positions. Limit switch 21 outputs ON/OFF signals representing contact/noncontact with stopper 19, for monitoring the elevation state of stoppers 19.

Limit switch 21 may be mounted to housing 16 so as to contact with a corresponding one of stoppers 19 when stoppers 19 come to downward limit positions. Otherwise, limit switch 21 may be mounted to not housing 16 but a component of link mechanism 20, provided that limit switch 21 can detect the elevation state of stoppers 19.

Slopes 22 are made of a metallic material such as an iron, and are detachably mounted to the vehicle front side and the vehicle rear side of housing 16 as shown in FIGS. 1 to 5.

As shown in FIGS. 3 to 5, each of slopes 22 includes a body 60 and an insertion piece 61. Body 60 includes an inclined surface 60a structured to guide tire 4 to rollers 15. Insertion piece 61 includes a tip inserted in a corresponding one of grooves 37 of housing 16. Body 60 has a cross section shaped to be substantially a right-angled triangle, wherein inclined surface 60a is a hypotenuse of the triangle and serves as a continuous surface to connect a top surface of housing 16 to a floor surface of a place for implementing the inspection.

Insertion piece 61 has a substantially L-shaped cross section, and includes a flat part 61a projecting from body 60 and an insertion part 61b extending from flat part 61a downwardly in the vehicle height direction (i.e., in a downward direction in FIG. 5). Insertion piece 61 is formed by, for example, bending a rectangular plate into an L-shape.

As shown in FIG. 3, each of slopes 22 is detachably mounted to housing 16 by inserting insertion part 61b of insertion piece 61 into a corresponding one of grooves 37 of housing 16 at a position shifted with respect to positions at which support pieces 35b of supporter 35 are inserted. Insertion piece 61 is positioned nearer to the vehicle in the vehicle width direction than support pieces 35b of supporter 35. Insertion part 61b of insertion piece 61 is inserted in groove 37 at a position nearer to the vehicle than support pieces 35b of supporter 35.

Thus, slopes 22 and side roller 17 are mounted to the same grooves at the different positions.

Each pair of tire supporters 2 different from each other in position in the front-and-rear direction of vehicle 3 are different from each other in length in the vehicle front-and-rear direction of slopes 22 mounted to the each pair of tire supporters 2. In other words, slopes 22 mounted to the right-and-left pair of tire supporters 2a for idling of the front wheels of tires 4 of vehicle 3 are different in length in the vehicle front-and-rear direction from slopes 22 mounted to the right-and-left pair of tire supporters 2b for idling of the rear wheels of tires 4 of vehicle 3.

As described above, inspection device 1 (i.e., tire supporters 2) can be disposed or installed on a flat plane (i.e., a floor surface) on which vehicle 3 can travel.

Thus, inspection device 1 eliminates necessity for preparing a pit or a depression for containing various components (e.g., link mechanism 20 for elevation of stoppers 19) on the floor upon installation, and serves to increase flexibility in selecting a place for implementing inspection.

Inspection device 1 (tire supporters 2) includes stoppers 19 structured to butt into tires 4. This allows vehicle 3 to ride onto and get off from inspection device 1 by self-propellant without an incidental device such as a winch.

Inspection device 1 (tire supporters 2) is configured such that stoppers 19 are disposed between rollers 15 and fill gaps between rollers 15. This serves to suppress rollers 15 from catching a finger of an operator. Thus, inspection device 1 (tire supporters 2) serves to improve safety of operation because stoppers 19 are disposed between rollers 15.

Inspection device 1 (tire supporters 2) includes limit switch 21. This facilitates grasping of whether being in a state for allowing tires 4 of vehicle 3 to ride onto or get off from rollers 15 or not.

Thus, upon an inspection, inspection device 1 allows an inspector to easily monitor or check whether tires 4 of vehicle 3 may ride onto or get off from rollers 15 or not.

Each of tire supporters 2 includes three movement rollers 25 rotatably mounted to housing 16. This allows each of tire supporters 2 to easily move by rotation of movement rollers 25 while maintaining an attitude of housing 16 horizontal. Especially, upon movement of tire supporter 2 by rotation of movement rollers 25, three movement rollers 25 allow tire supporter 2 to move in a direction inclined with respect to a direction of rolling of rollers 15 in plan view (in other words, move in a direction to rotate tire supporter 2 in plan view). This facilitates fine adjustment for arrangement of tire supporters 2.

Each pair of tire supporters 2 aligned in the vehicle width direction are coupled to each other via coupler 24 being the elongated rectangular plate.

This allows each pair of tire supporters 2 aligned in the vehicle width direction to accord central positions of the right-and-left pair of housings 16, and allows the right-and-left pair of housings 16 to accord positions of projections and depressions due to rollers 15. This allows each right-and-left pair of tires 4 to idle under substantially same conditions when idling on rollers 15. Thus, inspection device 1 allows each right-and-left pair of tires 4 to idle under substantially same conditions, and thereby serves to improve accuracy of the inspection.

Inspection device 1 (tire supporters 2) includes side rollers 17. This suppresses vehicle 3 from moving (i.e., dashing out) in the vehicle width direction during the inspection, and thereby suppresses vehicle 3 from dropping off inspection device 1 (tire supporters 2).

Inspection device 1 (tire supporters 2) is structured to allow change in mount position of side rollers 17 depending on the tread width of vehicle 3, and thereby conform to vehicles with various tread widths.

Each of tire supporters 2 is movable in a state in which slopes 22 have been detached. This facilitates installation of tire supporters 2 in accordance with a wheelbase length of vehicle 3.

Slopes 22 are detachably mounted to tire supporters 2. This facilitates moving and storing of tire supporters 2.

Each pair of tire supporters 2 different from each other in position in the vehicle front-and-rear direction are different from each other in length in the vehicle front-and-rear direction of slopes 22 mounted to the each pair of tire supporters 2.

This causes a timing of contact between slopes 22 and the front wheels of tires 4 of vehicle 3 to be different from a timing of contact between slopes 22 and the rear wheels of tires 4 of vehicle 3, and reduces force required for vehicle 3 to ride onto slopes 22.

This allows vehicle 3 to easily ride onto tire supporters 2 by self-propellant or ride onto tire supporters 2 by manpower of an operator(s) with no incidental device, and facilitates implementation of an inspection employing inspection device 1.

Each of tire supporters 2 includes support pieces 35b of supporter 35 and insertion pieces 61 of slopes 22 that are both inserted in grooves 37 of housing 16.

Thus, each of tire supporters 2 is structured such that slopes 22 and side roller 17 are mounted to the same grooves. This serves to simplify tire supporters 2 in structure for mounting of slopes 22 and side roller 17, and thereby improves productivity while reducing costs.

Each of tire supporters 2 includes safety fence 18 detachably mounted at a position outer with respect to side roller 17. This ensures safety against entanglement into tires 4 rotating during an inspection. Thus, inspection device 1 serves to ensure safety during an inspection.

Although the above describes the specific embodiment of the present invention, the present invention is not limited to the above embodiment but may be variously modified without departing from intention of the invention.

For example, inspection device 1 may be modified to provide tire supporters 2 with only some of tires 4 of vehicle 3.

Furthermore, the number of rollers 15 in each housing 16 is not limited to four but may be a plural number other than four.

The invention claimed is:

1. A vehicle inspection device for inspection implemented with a tire of a vehicle idling, the vehicle inspection device comprising:
   a tire supporter including:
      rollers structured to allow the tire to idle;
      a housing supporting the rollers so as to allow the rollers to rotate;
      a stopper contained in the housing and structured to move up and down and butt into the tire disposed on the rollers; and
      a link mechanism structured to elevate the stopper,
   wherein:
      the tire supporter is structured to be disposed on a plane that allows the vehicle to run thereon;
      the link mechanism includes a first link mechanism and a second link mechanism;

the first link mechanism is disposed adjacently to a first end of the stopper in a vehicle width direction, and supports the first end of the stopper rotatably;

the second link mechanism is disposed adjacently to a second end of the stopper in the vehicle width direction, and supports the second end of the stopper rotatably; and the stopper is structured to be lifted up and down in response to forward and backward movement of the second link in the vehicle width direction, and thereby move the stopper upward and downward in a vehicle height direction.

2. The vehicle inspection device as claimed in claim 1, the vehicle inspection device further comprising:
a limit switch structured to detect an elevation state of the stopper.

3. The vehicle inspection device as claimed in claim 1, the vehicle inspection device further comprising:
three movement rollers mounted to an exterior of the housing such that each of the three movement rollers is rotatable.

4. The vehicle inspection device as claimed in claim 1, the vehicle inspection device comprising:
a pair of the tire supporters aligned in the vehicle width direction and coupled to each other via a coupler; and
the coupler is detachable from the housing.

5. The vehicle inspection device as claimed in claim 1, the vehicle inspection device further comprising:
a side roller structured to restrict movement of the vehicle in the vehicle width direction and rotatably supported by the housing.

6. The vehicle inspection device as claimed in claim 5, wherein the vehicle inspection device is structured to allow change in mounting position of the side roller depending on a tread width of the vehicle.

7. The vehicle inspection device as claimed in claim 5, the vehicle inspection device further comprising:
a slope that is detachably mounted to the housing, and includes an inclined surface structured to guide the tire to the rollers.

8. The vehicle inspection device as claimed in claim 7, the vehicle inspection device comprising:
a plurality of the tire supporters aligned in a vehicle front-and-rear direction,
wherein each pair of the tire supporters of the plurality of the tire supporters aligned in the vehicle front-and-rear direction are different from each other in length in the vehicle front-and-rear direction of slopes mounted to the each pair of the tire supporters.

9. The vehicle inspection device as claimed in claim 7, wherein:
the side roller is rotatably supported by a supporter mounted to the housing;
the supporter includes a support piece inserted in a groove formed in the housing;
the slope includes an insertion piece inserted in the groove; and
the slope is detachably mounted to the housing by insertion of the insertion piece.

10. The vehicle inspection device as claimed in claim 5, the vehicle inspection device further comprising:
a safety fence that is detachably mounted to the housing at a position outer with respect to the side roller.

11. The vehicle inspection device as claimed in claim 5, the vehicle inspection device further comprising:

a safety fence that is detachably mounted to the housing, and is positioned outer with respect to the tire of the vehicle in the vehicle width direction.

12. A vehicle inspection device for inspection implemented with a tire of a vehicle idling, the vehicle inspection device comprising:
a tire supporter including:
rollers structured to allow the tire to idle;
a housing supporting the rollers so as to allow the rollers to rotate;
a stopper contained in the housing and structured to move up and down and butt into the tire disposed on the rollers; and
a link mechanism structured to elevate the stopper,
wherein:
the tire supporter is structured to be disposed on a plane that allows the vehicle to run thereon;
the link mechanism includes a first link mechanism and a second link mechanism;
the first link mechanism is disposed adjacently to a first end of the stopper in a vehicle width direction, and supports the first end of the stopper rotatably;
the second link mechanism is disposed adjacently to a second end of the stopper in the vehicle width direction, and supports the second end of the stopper rotatably;
the first link mechanism includes a first link and a second link;
the first link includes a first end rotatably connected to the first end of the stopper, and includes a second end rotatably connected to the housing;
the second link includes a first end rotatably connected to the first end of the stopper, and is structured to move forward and backward in the vehicle width direction;
the second link mechanism includes a third link;
the third link includes a first end rotatably connected to the second end of the stopper, and includes a second end rotatably connected to the housing; and
the stopper is structured to be lifted up and down in response to forward and backward movement of the second link in the vehicle width direction, and thereby move upward and downward in a vehicle height direction.

13. A vehicle inspection device for inspection implemented with a tire of a vehicle idling, the vehicle inspection device comprising:
a tire supporter including:
rollers structured to allow the tire to idle;
a housing supporting the rollers so as to allow the rollers to rotate;
a stopper contained in the housing and structured to move up and down and butt into the tire disposed on the rollers; and
a link mechanism structured to elevate the stopper,
wherein:
the tire supporter is structured to be disposed on a plane that allows the vehicle to run thereon;
the link mechanism includes a first link mechanism and a second link mechanism;
the first link mechanism is disposed adjacently to a first end of the stopper in a vehicle width direction, and supports the first end of the stopper rotatably;
the second link mechanism is disposed adjacently to a second end of the stopper in the vehicle width direction, and supports the second end of the stopper rotatably;

the stopper is disposed between the rollers, and moves up and down between the rollers; and the stopper is structured to be lifted up and down in response to forward and backward movement of the second link in the vehicle width direction, and thereby move the stopper upward and downward in a vehicle height direction.

* * * * *